United States Patent Office 3,700,664
Patented Oct. 24, 1972

3,700,664
PREPARATION OF THIONAMIDES
Mikhail M. Girgis, Guelph, Ontario, Canada, assignor to Uniroyal, Ltd., Montreal, Quebec, Canada
No Drawing. Filed Mar. 26, 1970, Ser. No. 23,063
Int. Cl. C07d 87/46
U.S. Cl. 260—247.1                10 Claims

ABSTRACT OF THE DISCLOSURE

Thionamides are formed in high yield by reacting alkyl, aryl, heterocyclic nitriles, or phenylacetonitriles and hydrogen sulfide under pressure in the presence of a minimal amount of basic catalyst. The use of a minimal amount of catalyst prevents the reverse decomposition of the thionamide to nitrile and hydrogen sulfide.

FIELD OF THE INVENTION

This invention relates to the preparation of thionamides, especially thionacetamide. Thionamides are useful as additives for rubber and petroleum and as agricultural chemicals. These compounds have been found to be more useful as intermediates in the production of agricultural chemicals, e.g., herbicides, fungicides and insecticides.

PRIOR ART

The most recent and authoritative discussion of the preparation of thionamides is Walter and Bode, Syntheses of Thiocarboxamides, Angew. Chem. Internat. Edit. 5, 447–461 (1966) as well as the references contained therein, especially Hurd and De La Mater, Chemical Reviews 61, 45 (1961). In the patent literature, Gilbert et al. U.S. 3,274,243 is pertinent. These patentees employed an amine catalyst in at least 1:10 and preferably 1:2 molecular proportions of amine:aliphatic nitrile employed in the reaction mixture, and terminated the reaction in about eight hours. The presence of the amine catalyst in the range of 10 to 50% with more than 100% excess nitrile in the reaction mixture requires that the recovery of the thionamide produced should be accomplished within 24 hours. If this is not done, the reaction product will revert to the nitrile and hydrogen sulfide gas and the maximum 55% yield (based on the nitrile) decreases drastically.

THE INVENTION

This invention relates to the preparation of alkyl, including carbalkoxyalkyl, aryl, heterocyclic thionamides and of phenylacetothionamides from the corresponding nitriles and hydrogen sulfide according to the equation:

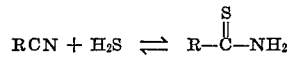

In this reaction, essentially equal molar amounts of the nitrile and hydrogen sulfide are heated at 80–125° C. in the presence of a basic catalyst, the molar ratio of catalyst to nitrile being in the range from about 1:20 to 1:100, and preferably 1:80. The use of such a minimal amount of catalyst prevents the reverse decomposition warned against by Gilbert et al.

The advantages of the present process over those of the prior art are: (1) The present process, using aliphatic nitriles, takes place without any internal (excess nitrile) or external (e.g., alcohol or xylene) solvent being required, thereby eliminating needless cost for excess material or suitable solvents and the necessity for extra procedures for their recovery. However, when aryl or heterocyclic nitriles are reacted the use of an appropriate solvent is recommended. (2) Since the level of amine catalyst in the present process is less than 1 molar percent in the reaction mixture and more than 90% of the nitrile has been converted to the corresponding thionamide when the starting nitrile is acetonitrile, the reaction product has been found to be stable. This eliminates the prior complex procedures for the recovery of the reaction product. (3) The reaction of the present process is completely carried out in a closed system thereby eliminating loss of materials.

The preparation of the thionamides is conveniently carried out by loading an autoclave with the required amount of catalyst and nitrile and introducing the necessary amount of hydrogen sulfide under pressure. The autoclave is heated to a temperature of 80–125° C. at which temperature a pressure of 100–200 lbs. per square inch will develop. The duration of heating will vary with the nitrile but is generally two to four hours. At the end of the reaction, the autoclave is cooled, depressurized, the contents removed via a solvent and filtered. The catalyst may be removed by washing with a solvent (e.g., methylene chloride, a low boiling hydrocarbon such as benzene or xylene, or an alcohol such as isopropyl alcohol), although, when the thionamide is used as an intermediate for the synthesis of other compounds, the catalyst is present in such small amounts that it may be left in.

Suitable catalysts include ammonia, the lower alkyl primary, secondary and tertiary aliphatic amines, such as methylamine, ethylamine, isopropylamine, n-butylamine, sec.-butylamine, cyclohexylamine, benzylamine, ethanolamine. Other catalysts include sodium sulfide, potassium sulfide, tetramethylguanidine, phenylguanidine, piperidine and the secondary amines of Neiderhauser U.S. 2,870,-207.

While the invention is particularly directed to the preparation of thionacetamide, it is generally applicable to the preparation of higher thionamides such as are derived from the reaction of hydrogen sulfide with: (1) Aliphatic nitriles such as propionitrile, butyronitrile, valeronitrile, or caprylonitrile, (2) Aromatic nitriles such as benzonitrile, o-tolunitrile, or m-tolunitrile, (3) Heterocyclic nitriles such as nicotinonitrile, picolinonitrile, or N-morpholinonitriles, (4) Phenylacetonitriles.

EXPERIMENTAL

Example 1

Acetonitrile, 164.2 g. (4.0 moles), and 3.7 g. (0.05 mole) of diethylamine were placed in a one liter stainless steel autoclave equipped with inlets for hydrogen sulfide and nitrogen, a stirrer, pressure gauge, thermocouple and recorder to record and control the temperature of the reaction. The autoclave was sealed, purged first with nitrogen (although such elimination of air from the reactor is not essential) and then with hydrgen sulfide. Hydrogen sulfide gas was then added until the pressure was 150 lbs. per square inch, and this pressure was maintained by continuous addition of hydrogen sulfide gas for two hours while the autoclave was heated at 100–105° C. Then the autoclave was cooled to about 10° C. and depressurized. The reaction product was removed as a thick slurry in toluene, filtered, washed with chloroform and dried under vacuum at room temperature. The product thus obtained was somewhat impure, melting at 100–115° C. On recrystallization from xylene, it was obtained as white crystals melting at 112–116° C. The yield was 270 g. of thionacetamide (90% based on acetonitrile).

Example 2

The procedure of Example 1 was repeated, except that 3.6 g. of diisopropylamine were used and the autoclave was heated and maintained for two hours at 100–105° C. and under pressure of 250 lbs. per square inch.

A yield of 294 g. of thionacetamide melting at 100–105° C. was obtained (98% based on acetonitrile).

Example 3

The procedure of Example 1 was repeated, except that 7.2 g. diisopropylamine were used and the autoclave was heated at 100–105° C. and maintained at 100 lbs. per square inch pressure for four hours. A quantitative yield of crude thionacetamide, having a melting point of 100–105° C., was obtained.

Example 4

The procedure of Example 1 was repeated except that 14.6 g. (0.2 mole) of diethylamine were used, and the pressure of hydrogen sulfide gas was 90 lbs. per square inch. The temperature of the system was maintained between 85–90° C. for three hours. The yield of product of melting point 105–108° C. was 73% based on acetonitrile used.

Example 5

The procedure of Example 4 was repeated. 82 g. (2 moles) of acetonitrile were reacted with hydrogen sulfide gas under 90 lbs. per square inch pressure in the presence of 14.6 g. (0.2 mole) of diethylamine. The reaction mixture was maintained at 80–90° C. for three hours. The yield was 82 g. representing 55% based on the amount of acetonitrile used.

Examples 4 and 5 demonstrate that, when the molar ratio of amine to aliphatic nitrile is increased above 1:80, the yield of the desired product falls off drastically. In Example 4, the molar ratio is 1:20, and in Example 5, 1:10.

Example 6

Into a one liter stainless steel autoclave (equipped as specified in Example 1), 390 g. acetonitrile (9.5 moles) were charged together with 7.1 g. (0.12 mole) of ethanolamine. The autoclave was sealed, purged with nitrogen and then with hydrogen sulfide and then 198 g. (5.8 moles) hydrogen sulfide were added to the reactor at about 5–100° C. The reaction mixture was heated gradually to 125° C. for fifteen minutes, cooled to 80° C. and maintained at this temperature for two hours. The autoclave was cooled to 10° C., opened and the reaction product removed as a thick slurry in acetonitrile. It was filtered, washed with acetonitrile and vacuum dried at room temperature. This gave 398 g. of white crystalline thionacetamide as a residue. An additional 24 g. were recovered by distilling the unreacted nitrile. The overall yield was 93% based on the amount of hydrogen sulfide used. The melting point of the product was 108–111° C.

Example 7

Using the procedure of Example 1, 64.8 g. (0.94 mole) of butyronitrile were reacted with hydrogen sulfide gas maintained at 250 lbs. per square inch pressure in the presence of 3.6 g. (0.035 mole) of diisopropylamine at 100–105° C. for about three hours. The autoclave was cooled to 10° C. and depressurized. The reaction product was recovered as a red-yellow oily liquid decomposing on distillation. The yield of butyrothionamide was 70 g., corresponding to 72% of theory based on the nitrile employed.

Example 8

103 g. (1 mole) of benzonitrile, 3.7 g. (0.05 mole) of diethylamine and 200 ml. absolute ethanol were placed in the stainless steel reactor of Example 1. Then, 34 g. (1 mole) of hydrogen sulfide gas were added to the reaction mixture at room temperature and the reactor was heated to 100° C. for two hours. At the end of the reaction, the autoclave was cooled to 10° C. and the product was recovered by removing the alcohol on a steam bath under reduced pressure. The yield of benzothionamide melting at 113–115° C. was 133 g. or 98% of theory based on the nitrile used.

Example 9

Using the procedure of Example 8, 87.8 g. (0.75 mole) m-tolunitrile were reacted with 25.5 g. (0.75 mole) hydrogen sulfide gas in the presence of 3.7 g. (0.05 mole) of diethylamine and 200 ml. ethanol at 100° C. for two hours. The yield of m-toluthionamide melting at 82–84° C. was 98 g. or 86% of theory based on the nitrile used.

Example 10

Applying the same procedure of Example 9, 53 g. (0.5 mole) of nicotinonitrile were reacted with 17 g. (0.5 mole) of hydrogen sulfide gas in the presence of 1.8 g. (0.02 mole) of diethylamine and 200 ml. ethanol at 100° C. for two hours. The yield of nicotinothionamide, melting at 190–193° C., was 65 g. or 93% of theory based on the amount of nicotinonitrile used.

Example 11

The procedure of Example 10 was repeated except that 53. g. (0.5 mole) of picolinonitrile were used instead of the nicotinonitrile. The yield of picolinothionamide melting at 139–141° C. was 61 g. or 87% of theory based on the nitrile employed in the reaction.

Example 12

N-morpholinonitrile, 50 g. (0.45 mole), and 7.2 g. (0.07 mole) of diisopropylamine were placed with 200 ml. of dimethyl formamide (DMF) into a one liter stainless steel autoclave (equipped as specified in Example 1). 17 g. (0.5 mole) of hydrogen sulfide gas were added to the reaction mixture at room temperature. Then, the reactor was heated to 80° C. for 1½ hours. At the end of the reaction time, the autoclave was cooled to 10° C. and the product was recovered by removing most of the solvent (DMF) on a steam bath under reduced pressure. The yield of N-morpholinothionamide melting at 160–161° C. was 50 g., corresponding to 77% of theory based on the nitrile used.

*Analyses.*—Calculated for $C_5H_{10}N_2OS$ (percent): C, 41.1; H, 6.8; N, 19.2. Found (percent): C, 41.3; H, 6.5; N, 19.3.

The product of this example is a new compound.

Example 13

101 g. (0.86 mole) of phenylacetonitrile, 7.3 g. (0.1 mole) of diethylamine and 200 ml. ethanol were placed in the stainless steel reactor of Example 1. The reaction mixture was heated to 80° C. and hydrogen sulfide gas was added at this temperature to maintain a reaction pressure of 250 lbs. per square inch. Then, the temperature was adjusted and maintained at 120° C. for two hours. The thionamide was isolated by evaporating the reaction mixture on a steam bath under vacuum. The yield of phenylacetothionamide melting at 95–98° C. was 93 g. or 72% of theory based on the nitrile employed.

Example 14

This example demonstrates the utility of thionacetamide.

A slurry of thionacetamide (18.7 g., 0.25 mole) in acetonitrile (200 ml.) was placed in a 500 ml. three-necked flask. The flask was equipped with a stirrer, thermometer, and reflux condenser. 54 g. (0.25 mole) of α-chloroacetoacetanilide were added and the temperature of the system was maintained between 65–70° C. with stirring for 20 minutes. The reaction mixture was cooled to about 5° C. in an ice-bath. The reaction product was removed as a slurry in acetonitrile, filtered, washed with cold water, and dried. The yield was 64 g. (95% of theory based on the thionamide used). The product, 5-carboxanilido-2,4-dimethylthiazole hydrochloride is a light pink crystalline material, M.P. 212–214°. This is a new product with broad microbiocidal activity of the types disclosed and claimed in Kulka et al., application Ser. No.

611,197 (filed Dec. 7, 1966, now U.S. Pat. No. 3,505,055 issued on Apr. 7, 1970).

*Analyses.*—Calculated for $C_{12}H_{13}ClN_2OS$ (percent): C, 53.6; H, 4.8; N, 10.4; S, 11.9. Found (percent): C, 53.59; H, 4.77; N, 10.45; S, 11.87.

Example 15

This example shows the pronounced biological activity possessed by N-morpholinothionamide.

Eight tomato plants infected with tomato early blight were isolated and treated in the following manner:

Two plants were sprayed to run off with a solution containing 2000 p.p.m. of N-morpholinothionamide, two plants were sprayed to run off with a solution containing 500 p.p.m. of N-morpholinothionamide and four plants were held as a control. The results obtained were measured as percentage of control of the tomato early blight when compared with the four control plants.

| PPM of N-morpholino-thionamide: | Percentage of control |
|---|---|
| 2000 | 90 |
| 500 | 85 |

Having thus described my invention, what I claim and desire to protect by Letters Patent is:

1. In a method of preparing an alkyl, carbalkoxyalkyl, aryl, heterocyclic, or phenylacetothionamide which comprises reacting an alkyl, carbalkoxyalkyl, aryl, heterocyclic, or phenylacetonitrile with a substantially equimolar amount of hydrogen sulfide in a closed reactor at elevated temperature in the presence of a basic catalyst, the improvement which comprises conducting the reaction in the presence of a mole ratio of catalyst to nitrile in the range of from 1:20 to 1:100 and preferably 1:80.

2. The process of claim 1, in which the nitrile is acetonitrile and the catalyst is diethylamine.

3. The process of claim 1, in which the nitrile is acetonitrile and the catalyst is diisopropylamine.

4. The process of claim 1, in which the nitrile is acetonitrile and the catalyst is ethanolamine.

5. The process of claim 1, in which the reaction is conducted under a pressure of from 100 to 200 lbs. per square inch.

6. The process of claim 1, in which the nitrile is an aryl nitrile selected from the group consisting of benzonitrile and tolunitriles.

7. The process of claim 1, in which the nitrile is nicotinonitrile.

8. The process of claim 1, in which the nitrile is picolinonitrile.

9. The process of claim 1, in which the nitrile is N-morpholinonitrile.

10. The process of claim 1, wherein the basic catalyst is selected from the group consisting of ammonia, the lower aliphatic primary, secondary and tertiary amines, tetramethylguanidine, phenyl guanidine, piperidine and secondary aliphatic amines in which the aliphatic groups are alkyl or alkenyl groups of 12 to 24 carbon atoms, one of the aliphatic groups containing a tertiary carbon atom attached directly to the nitrogen atom and the other aliphatic group containing at least one carbinyl carbon atom which is not alpha or beta to the nitrogen atom.

References Cited

UNITED STATES PATENTS 2,280,578  4/1942  Hanford et al. _____ 260—551

ALEX MAZEL, Primary Examiner

J. TOVAR, Assistant Examiner

U.S. Cl. X.R.

260—294.8 E, 306.8, 551 R; 424—246